INVENTOR
Horst Schmidt
BY
Krafft & Wells
ATTORNEYS

United States Patent Office 3,529,882
Patented Sept. 22, 1970

3,529,882
COMBINED DAY AND NIGHT VIEWING TELESCOPE
Horst Schmidt, Nauborn, Kreis Wetzlar, Germany, assignor to Ernst Leitz G.m.b.H., Wetzlar, Germany
Filed Dec. 12, 1966, Ser. No. 600,850
Claims priority, application Germany, Dec. 22, 1965,
L 52,451
Int. Cl. G02b 13/16
U.S. Cl. 350—2         5 Claims

ABSTRACT OF THE DISCLOSURE

A combined day and night viewing telescope is provided having one objective member that is used for both kinds of observation in combination with two additional interchangeable objective members wherein the one is adapted for night vision and along with its image converter is interchangeable with the other which is adapted for day vision, the two interchangeable objective members having the same focal plane but are separately corrected for chromatic aberration.

BACKGROUND OF THE INVENTION

Figure 1:
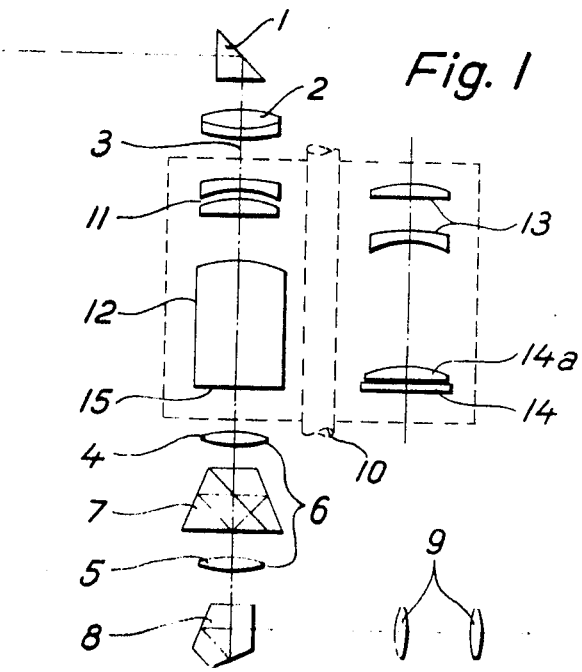

Combined day and night viewing telescopes are known in the prior art in which an image converter is positioned in the optic axis of the telescope behind the objective for night viewing, and for daytime observation it is bypassed by a bridge of mirrors, prisms or the like that are swung into or out of position. To permit the use of the same system on the ocular side for both kinds of observation, it is necessary to provide the daytime optic with a focal plane corresponding to the screen image plane of the image converter. In the prior art construction this is accomplished by interposing an intermediate system in that portion of the optical path which has been widened by the bridge of mirrors. By a suitable adaptation of this intermediate system it is also possible to make a special correction of the daytime viewing optic in the visible spectral range. The additional focal plane and the increased number of optical surfaces introduced by the intermediate system has an unfavorable effect on the focusing precision.

Another construction has been suggested by the prior art in which the image converter is positioned in that portion of the optical path which is diverted by the mirrors. The use of additional optical elements for the day system is thereby rendered unnecessary if the increased length of the ray path corresponds to the length of the image converter, namely the distance between the focal plane on the entrance side and the screen image surface. This construction has, however, the limitation that any adjustment of the objective to the different conditions of day and night viewing requires the substitution of the entire objective or the use of two objectives for the two kinds of viewing.

In the prior art construction of a combined day and night viewing telescope shown in U.S. Pat. 2,946,255, the same objective is used for both kinds of viewing and is corrected for only one spectral range, and therefore produces optimum results for only one kind of observation.

DESCRIPTION OF THE INVENTION

It is, therefore, an object of the present invention to provide a telescope for spectral adaptation to the kind of observation desired in a simple manner on the objective side and without the use of an intermediate system.

Another object of the invention is a day and night viewing telescope having a common intermediate system and ocular.

Still another object of the invention is a day and night viewing telescope having a common stationary objective.

A particular object of the invention is a day and night viewing telescope having interchangeable night and day viewing objective members.

Upon further study of the specification, drawing and claims other objects and advantages of the present invention will become apparent.

According to the present invention a combined day and night viewing telescope is provided having one objective member that is used for both kinds of observation in combination with two additional interchangeable objective members wherein one is adapted for night vision and it is substituted, together with the image converter, for the other which is adapted for day vision. The two objective members are corrected differently in such a manner that in combination with their common objective member they form, according to their intended use, either a daytime objective for use in the visible range of the spectrum, or a nighttime objective for use with infrared radiation.

For changing over from day to night viewing, a transposing member is used, as for example, a revolver. It is also possible, however, to mount the elements for day and night vision in fixed positions and to effect the change from the one to the other by means of tiltable mirrors. The first suggested embodiment is, however, preferred because it more readily permits the realization of the usual requirements for magnification. An image converter with relatively high magnification and relatively short structural length is preferred. The focal plane of the object for day viewing is made coincident with the screen picture surface to avoid the necessity of supplementing or altering the viewing means on the side of the objective during the switching over from day to night vision, and vice versa. This, however, limits the ability to change the magnification. To make such a change possible, one or more of the members that are aligned with the interchangeable objective elements are likewise made interchangeable. In this manner the focal plane of the day objective is given a desired position. In this manner the target mark plate is suitably positioned. The picture rectification is accomplished by an inversion prism, or by two prisms with 90° displacement.

Figure 2:
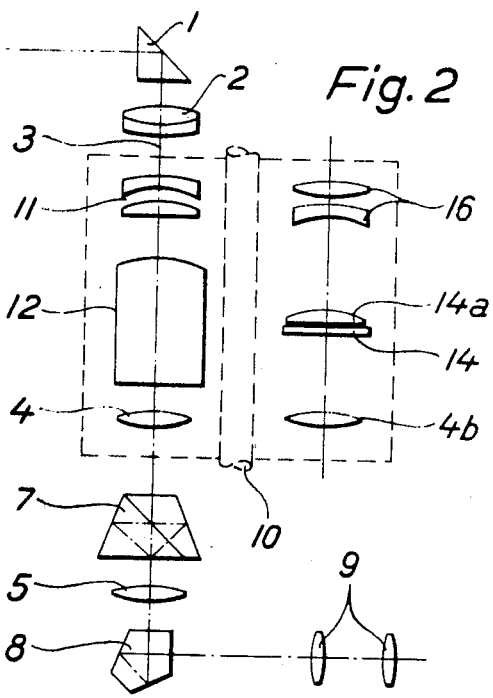

The particular embodiments of the invention can best be explained by reference to the accompanying drawings, wherein:

FIG. 1 is a day and night viewing telescope with interchangeable objective members shown schematically; and FIG. 2 is a day and night viewing telescope with interchangeable objective members and an intermediate system of aligned members, also shown schematically.

With particular reference to FIG. 1, it is seen that the rays which are diverted by the deflection prism 1 are directed to the stationary objective member 2 in the optic axis 3. The intermediate system 6 comprising lenses 4 and 5 with their interposed inverting prism 7 and the pentaprism 8 are positioned in the optic axis 3. The pentaprism sends the rays in the direction of the ocular 9.

A revolver 10 is positioned in the support to serve as a turret to permit two different systems to be brought selectively into optical alignment between the stationary objective member 2 and the lens 4. The interchangeable element for night viewing consists of the objective element 11 and the image converter 12. The interchangeable part for day viewing comprises the objective member 13, the target-mark plate 14 and the field lens 14a adjacent the plate. The objective members 11 and 13 are respectively so constructed in accordance with their intended use that in combination with the member 2 they form selectively a night objective corrected for infrared radiation or a day objective corrected for the visible spectrum. The focal plane of the day objective, in which the mark plate is positioned, lies in the same plane as the screen image surface 15 of the image converter 12, from which it follows that the member 13 has a different focal length than the member 11. The magnification of the day optic is, therefore, also different from that of the night optic.

The embodiment shown in FIG. 2 is based on the same general principle of construction as the embodiment of FIG. 1. The focal length of the interchangeable objective member 16, which is intended for day viewing, is determined in such a manner that member 16 in combination with the member 2 and the member 4b (which is carried by the revolver interchangeably with the member 4) satisfies the requirement for coincident positioning of the image plane on the ocular side of the system and for a given selective magnification. The spectral correction is effected in the same manner as in FIG. 1.

The embodiments of FIGS. 1 and 2 illustrate the use of the present invention in a panoramic telescope. In another embodiment contemplated by the present invention, the intermediate system 6 of FIG. 1 and the prisms 1, 7 and 8 are eliminated and ocular 9 is brought into direct alignment with the optic axis 3. As an alternative embodiment and in place of the revolver 10, the objectives are interchangeable by hand.

I claim:

1. A combined day and night viewing telescope comprising in combination, a lens member as a common part of two objectives and an ocular together for use with both kinds of viewing, and two interchangeable optical systems, each serving as the other part of said objectives, said lens member forming no real image in front of the interchangeable systems, the first one of said interchangeable optical systems being in optical alignment with an image converter and together with said converter interchangeable with the second one of said interchangeable optical systems, the lens member and the first interchangeable optical system forming a single objective adapted for night viewing with infrared radiation and forming a real image plane within the interchangeable system, and said second interchangeable optical system in combination with said lens member forming another single objective adapted for daytime viewing with the light of the visible spectrum and forming a real image plane within the interchangeable system, said daytime viewing system and said night viewing system having corresponding image planes with regard to the ocular.

2. The combined day and night viewing telescope of claim 1, wherein said first objective member together with the image converter is interchangeable with said second objective member by means of a revolver (10).

3. The combined day and night viewing telescope of claim 1, wherein said night viewing system has an image plane on the screen surface (15) being coincident with the image plane of said single objective for daytime viewing.

4. The combined day and night viewing telescope of claim 1, wherein said night viewing system and said daytime viewing system have additional members (6) between said image planes and the ocular.

5. The combined day and night viewing telescope of claim 4, wherein said additional members (4, 4b) are interchangeable together with said first and said second objective members.

References Cited

UNITED STATES PATENTS

| | | |
|---|---|---|
| 3,407,302 | 10/1968 | Bouwers. |
| 2,237,943 | 4/1941 | Lihotzky _____ 350—39 |
| 2,946,255 | 7/1960 | Bolay _____ 350—1 |
| 3,200,250 | 8/1965 | Bouwers _____ 350—182 X |

FOREIGN PATENTS 1,203,491  10/1965  Germany.

JOHN K. CORBIN, Primary Examiner

U.S. Cl. X.R.

350—54, 183